United States Patent [19]

Barkow et al.

[11] 4,326,108
[45] Apr. 20, 1982

[54] HOOK SWITCH FOR TELEPHONE INSTRUMENTS

[75] Inventors: Helmut Barkow, Steinbach; Karl Frank, Frankfurt am Main, both of Fed. Rep. of Germany

[73] Assignee: Telefonbau und Normalzeit GmbH, Frankfurt am Main, Fed. Rep. of Germany

[21] Appl. No.: 164,277

[22] Filed: Jun. 30, 1980

[30] Foreign Application Priority Data

Jul. 2, 1979 [DE] Fed. Rep. of Germany ....... 2926683

[51] Int. Cl.³ .................... H01H 21/24; H04M 1/08
[52] U.S. Cl. .................................. 179/164; 200/67 D
[58] Field of Search .......................... 179/159, 164; 200/67 DA, 67 DB, 67 D

[56] References Cited

FOREIGN PATENT DOCUMENTS 1134111 8/1962 Fed. Rep. of Germany ...... 179/159
2726565 12/1977 Fed. Rep. of Germany ...... 179/164
632862 12/1949 United Kingdom ............ 200/67 D Primary Examiner—Thomas W. Brown
Attorney, Agent, or Firm—Jacobson and Johnson

[57] ABSTRACT

A telephone hook switch having bounce contact spring which is formed like a frame with middle spring blades arched outwardly in opposite directions and attached at their lower ends with the attached lower ends held in a bearing slot of an operation part which connects to a switching balance. The operation part has a slot one one end for bearing onto the bounce contact spring. Several bounce contact springs and the associated outer springs may be combined like a comb over a stamped strip to be cut off after assembling. The operation part may also be formed comb-like of plastic.

13 Claims, 3 Drawing Figures

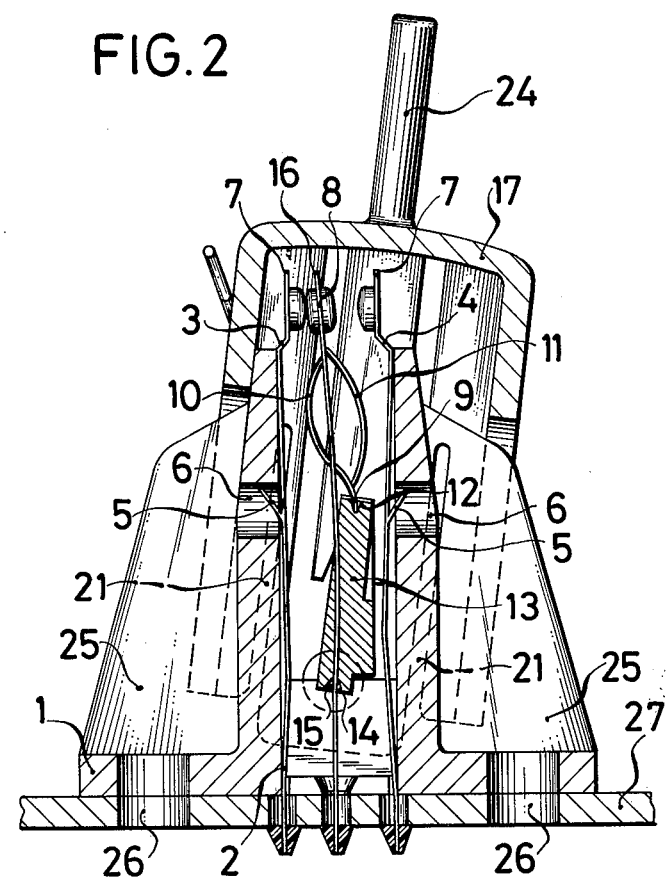

HOOK SWITCH FOR TELEPHONE INSTRUMENTS

BACKGROUND OF THE INVENTION

This invention relates to a hook switch for telephone instruments having at least one set of contact springs placed inside a case.

In conventional hook switches the switching speed of the contacts depends on the speed of off-hook operation. A slow operation leads thus to a slow creeping contacting which has an ill effect on the working life of the contacts. Especially when d.c. is switched, a rapid switching speed is important to minimize burning off and creep of material. With rapid switching speeds, long periods of contact chattering which otherwise might occur can then be avoided.

Bounce switches that are fitted out with a bounce spring in the form of a C are well known. These consist of many single parts which must be individually coupled together in a casing with a C-formed spring and combined whereby an expended mounting is necessary. The contact pressure in both switching states can differ and vary when using a C-formed spring.

It is therefore an object of the invention to provide a telephone hook switch without the said disadvantages in switching behavior and consists of only a few parts which are assembled easily without additional connection elements. Thereby it is possible to have a simple structure, less expensive to assemble and which can be at least partly assembled by automation.

According to this invention, this is achieved by a bounce contact spring formed like a frame which has in its middle two spring blades which are arched outwardly in opposite directions and are connected at their lower end, with this lower end held in a bearing slot of an operation part which is connected to a switching balance.

According to this invention, there is further provided a slot in the operation part for its bearing on the bounce spring at the opposite side of the spring blades.

Another improvement is that in a hook switch with several bounce springs, the outer contact springs may be connected comb-like by a stamped strip that can be cut off after assembling with the operation part also formed comb-like and made of plastic.

A further feature is that the bounce contact springs and the outer contact springs are closely guided in chambers of the socket part.

According to the invention, there is further provided that the outer contact springs have an initial tension and lie against the interior wall of the socket part and have outwardly arched studs which set into corresponding cutouts of the socket part.

Another improvement is that the switching balance is fitted out with boreholes, that the socket part has pins that interlock into said boreholes and that the side walls of the switching balance are formed elastically.

A further improvement is that the switching balance has slots in which corresponding fingers of the operation part are interlocked when the switching balance is slipped onto the socket part.

SUMMARY OF THE INVENTION

These and other features will be shown and described in the following description with reference to the drawings which:

FIG. 2 is a view of the hook switch taken along section line 2—2 of FIG. 1; and

Figure 1:
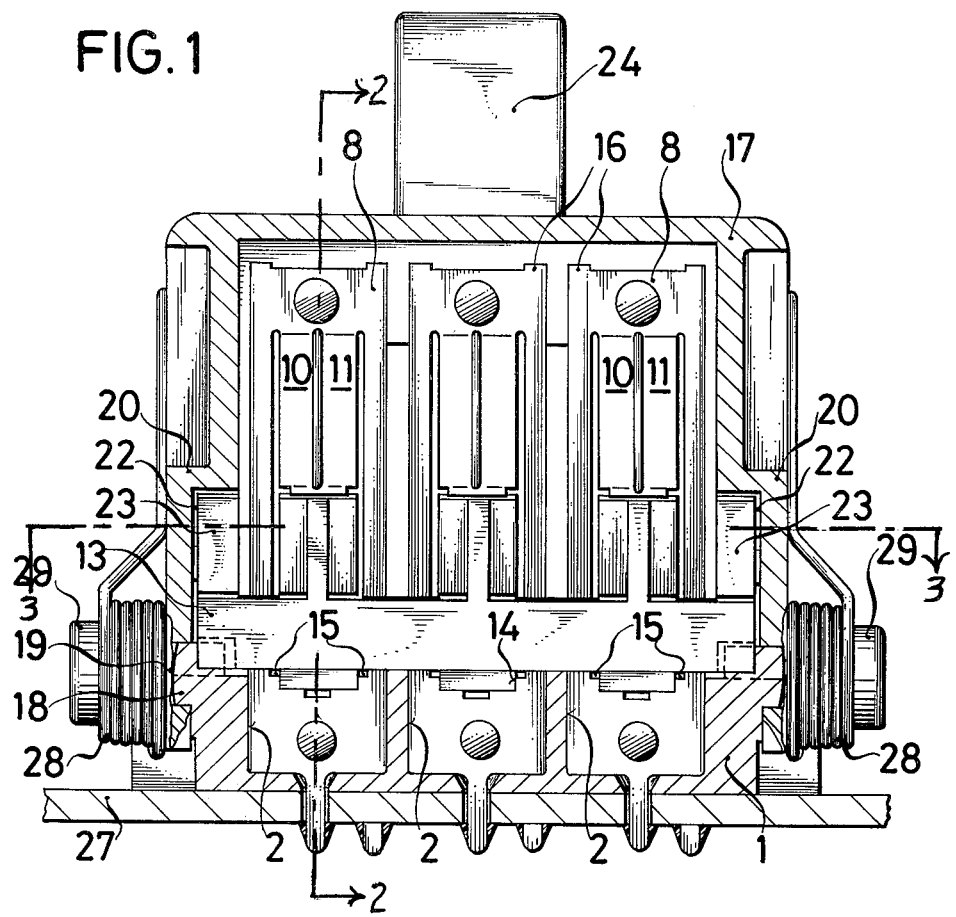
FIG. 1 is a front vertical section of a hook switch containing an embodiment of the invention.
Figure 3:
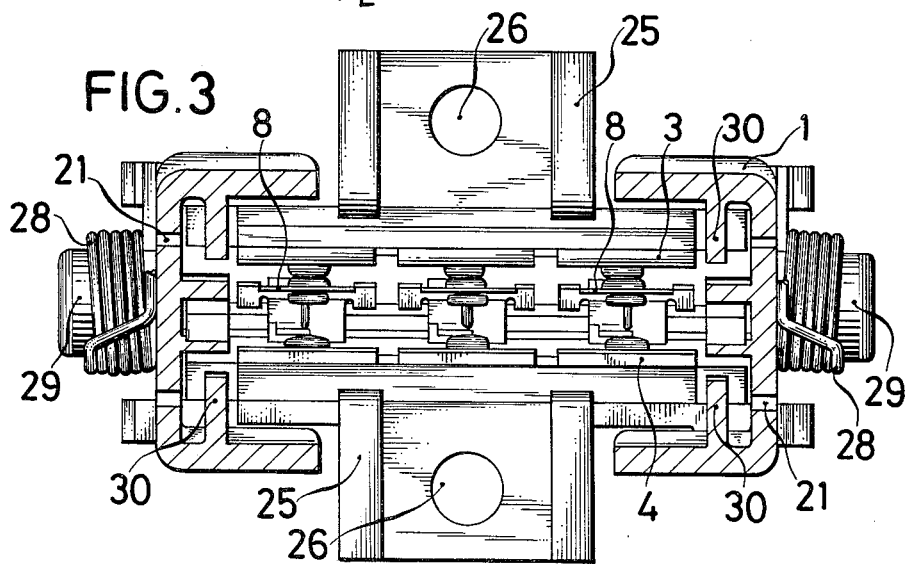
FIG. 3 is a view taken along section line 3—3 of FIG. 1.

A hook switch such as shown in FIGS. 1 and 3 is built onto a socket part 1. The lower portion of socket part 1 contains chambers 2 in which switch contact springs are snugly held. Outer contact springs 3 and 4 are initially in sets of three connected together as a stamped strip and, in this form, are inserted into the chambers 2. Each of these contact springs 3 and 4 have outwardly arched studs 5 which snap into cutouts 6 in the socket part 1. After intersection the stamped strip is cut off at the upper end 7 of the contact springs 3 and 4 (FIG. 2) thus becoming electrically separate springs. The outer contact springs 3 and 4 have an initial tension by which they lie snugly against the interior wall of chambers 2.

A set of three bounce contact springs 8 are initially connected together at their upper ends as a stamped strip. Each of the bounce contact springs 8 is formed like a frame in its upper part and has in the center of the frame two spring blades 10 and 11 which are arched oppositely outwards when stamped and are connected together at their lower ends 9. This lower end 9 is held in the bearing slot 12 of an operation part 13.

The operation part 13 is initially shaped like a comb and made of plastic and has a lower bearing slot 14 which is coupled to the edge 15 of each bounce contact spring 8. The distance between the bearing slots 12 and 14 is a little more than the space between the end 9 of the spring blades 10, 11 and the edge 15 of the bounce contact springs 8. The operating part 13 with its bearing slots 14 and 12 is inserted between the edge 15 of the bounce springs 8 and the end 9 of the spring blades 10 and 11. Subsequently, the stamping strip, which had kept the bounce springs 8 connected together, is cut off at point 16 and the operation part 13 is then inserted along with the bounce contact springs 8 into the chambers 2 of the socket part 1 from the upper side.

After that, switching balance 17 is slipped over the socket part 1 to enclose it. The socket part 1 is provided with pins 18 which fit into boreholes 19 of the switching balance 17. To achieve a better elasticity for the side walls 20 of the switching balance 17 when it is being attached to socket part 1, side walls 20 have slots 21. Slots 21 are at least partly closed to prevent dust from getting inside the switch via these slots. The lower bearing slots 14 and edges 15 of the bounce contact springs 8 are located on pivot axis of the switching balance 17 as defined by pins 18 in boreholes 19.

For attaching switching balance 17 securely to the operating part 13 fingers 23 of the operation part 13 snap into slots 22 inside the switching balance 17 when switching balance 17 is slipped over the socket part 1. The switching balance 17 is fitted out with an extending operation lever 24.

For stiffening the side walls of the socket part 1 there are provided supporting walls 25, which have boreholes 26 in their lower part for attaching a base plate 27 which, for example, may be a printed circuit board carrying necessary electrical circuitry.

As observed in FIG. 2, in operating the hook switch by moving a handset, switching balance 17 swings a first direction along with the operating part 13. The bounce contact springs 8 at first still rest against the contact springs 3. When switching balance 17 passes the central position, the bounce contact spring 8 suddenly jumps over the other side to make contact wit contact springs 4. The switching time is only a few milliseconds.

When moving in the opposite direction a similar switching action between contact springs 8 and 3 occurs. A torsion spring 28 is provided to cause this return switching procedure. Torsion spring 28 is attached to pivot 29 of the switching balance 17 to swing it to the desired position.

As the spring blades 10 and 11 are shaped totally symmetrical the contact pressure remains the same in both switch positions even after many switching actions.

We claim:

1. In a hook switch for telephone instruments having at least one set of outer contact springs (3, 4) and a movable switching balance (17) with an operation part (13) inside a case, the improvement comprising: a bounce contact spring (8) formed like a frame having a pair of center located spring blades (10, 11) which are arched outwardly in opposite directions and connected at their lower ends (9).

2. The arrangement as in claim 1 wherein said operation part (13) has a slot (12) on one end for receiving the connected ends (9) of said spring blades (10, 11).

3. The arrangement as claimed in claim 2 wherein said operation part (13) has a lower bearing slot (14) for holding an edge (15) of said bounce contact spring (8).

4. The arrangment as in claim 3 wherein said lower bearing slot is located on an end of the operation part opposite the end containing the first mentioned slot.

5. The arrangement as claimed in claim 1 wherein said bounce contact spring (8), said outer contact springs (3, 4) and said operation part (13) are set in chambers (2) of a socket part (1).

6. The arrangement as claimed in claim 5 wherein said outer contact springs (3, 4) lie with an initial tension against an interior wall of the chambers (2) in socket part (1) and have outwardly arched studs (5) which set in corresponding cutouts (6) in socket part (1).

7. The arrangement as claimed in claim 5 wherein the switching balance (17) has boreholes (19) for engaging pins (18) in socket part (1), with side walls (20) of said switching balance (17) being formed with slots (21).

8. The arrangement as claimed in claim 5 wherein the switching balance (17) has slots (22) for receiving interlocking corresponding fingers (23) of the operating part (13) when the switching balance (17) is slipped onto the socket part (1).

9. The arrangement as claimed in claim 3 wherein the lower bearing slot (14) of the operation part and edge (15) of the bounce contact spring (8) are located at a pivot axis of the switching balance (17).

10. The arrangement as claimed in claim 5 wherein the socket part (1) is provided with supporting walls (25) for stiffening the side walls and the supporting walls (25) have boreholes (26) in a lower part thereof for attaching a printed circuit board base plate (27).

11. The arrangement as claimed in claim 1 wherein the switching balance (17) is fitted out with an operation lever (24).

12. The arrangement as claimed in claim 11 wherein a torsion spring (28) is coupled to the switching balance (17) at pivots (29) thereof for returning the switching balance to a desired position.

13. The arrangement as claimed in claim 7 further including walls (30) die-casted to the switching balance (17) for at least partially covering over the slots (21) of the side walls (20).

* * * * *